United States Patent
Liu et al.

(10) Patent No.: US 8,509,214 B2
(45) Date of Patent: Aug. 13, 2013

(54) RELAY STATION AND BACKHAUL CONNECTION METHOD THEREOF

(75) Inventors: Shu-Tsz Liu, Taipei (TW); Chih-Chiang Wu, Shalu Township (TW); Kanchei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 322 days.

(21) Appl. No.: 12/821,832

(22) Filed: Jun. 23, 2010

(65) Prior Publication Data

US 2010/0322147 A1    Dec. 23, 2010

Related U.S. Application Data

(60) Provisional application No. 61/219,381, filed on Jun. 23, 2009.

(51) Int. Cl.
*H04J 3/06* (2006.01)

(52) U.S. Cl.
USPC ........... 370/350; 370/329; 370/503; 370/327; 455/11.1; 455/418

(58) Field of Classification Search
USPC . 370/315–332, 350, 503, 311; 455/418–444, 455/9, 11.1, 445
See application file for complete search history.

(56) References Cited

U.S. PATENT DOCUMENTS

| | | | |
|---|---|---|---|
| 2004/0162077 A1* | 8/2004 | Kauranen et al. | 455/445 |
| 2007/0173283 A1 | 7/2007 | Livet et al. | |
| 2008/0090575 A1* | 4/2008 | Barak et al. | 455/444 |
| 2009/0111476 A1 | 4/2009 | Hamalainen et al. | |
| 2010/0002611 A1* | 1/2010 | Umatt et al. | 370/311 |
| 2010/0130205 A1* | 5/2010 | Jung et al. | 455/435.2 |
| 2010/0227603 A1* | 9/2010 | Gupta et al. | 455/418 |
| 2010/0273416 A1* | 10/2010 | Yi et al. | 455/9 |
| 2011/0080864 A1* | 4/2011 | Cai et al. | 370/315 |

OTHER PUBLICATIONS

Taiwan Office Action for the Taiwan corresponding patent application TW 099120232 to the present application, Apr. 8, 2013, 10 pages, including machine translation attached to the front of the document.

* cited by examiner

*Primary Examiner* — Ian N Moore
*Assistant Examiner* — Hien Nguyen
(74) *Attorney, Agent, or Firm* — Skaar Ulbrich Macari, P.A.

(57) ABSTRACT

A relay station and a backhaul connection method thereof are provided. The relay station adopts an NAS mechanism. A wireless communication system comprises the relay station, a base station, and a core network. The relay station comprises a processing unit and a transceiver. The processing unit enters a first state of the NAS mechanism after the relay station creates a radio connection with the core network. The transceiver transmits a backhaul connection request to the base station after the relay station enters the first state. The processing unit then enters a second state of the NAS mechanism after the transmission of the backhaul connection request. The transceiver then receives a backhaul connection response from the base station after the transmission of the backhaul connection request. The processing unit then enters the first state after the receipt of the backhaul connection response.

14 Claims, 10 Drawing Sheets

RELAY STATION AND BACKHAUL CONNECTION METHOD THEREOF

PRIORITY

This application claims the benefit of U.S. Provisional Application Ser. No. 61/219,381, filed on Jun. 23, 2009, which is incorporated by reference herein in its entirety.

FIELD

The present invention relates a relay station and a backhaul connection method thereof. More particularly, the relay station and the backhaul connection method thereof of the present invention revise the states of a Non-Access Stratum (NAS) mechanism in order to achieve the backhaul connection.

BACKGROUND

Wireless communication technologies are widely used in nowadays. FIG. 1A illustrates the schematic view of a conventional wireless communication system 1. The wireless communication system 1 comprises a user equipment 11, a relay station 13, a base station 15, and a core network 17. The user equipment 11 is wirelessly connected to the relay station 13, the relay station 13 is wirelessly connected to the base station 15, and the base station 15 is wiredly connected to the core network 17.

The relay station 13 extends the serving coverage of the core network 17 so that a user equipment that is not in the coverage of the base station 15 but in the coverage of the relay station 13, such as the user equipment 11, can access the services provided by the core network 17. The base station 15 communicates with the core network 17 via an S1 interface, while the user equipment 11 communicates with the core network 17 via a Non-Access Stratum (NAS) mechanism.

FIG. 1B illustrates the states and the state transitions of a conventional NAS mechanism that is used in the user equipment 11. In FIG. 1B, the ellipses indicate the states in the NAS mechanism, while the texts along the arrows indicate the operations. The user equipment 11 starts at an EPS Mobility Management (EMM)-Null state 101. After the user equipment 11 enables the S1 mode, it enters the EMM-Deregistered state 102. Next, the user equipment 11 will enter the EMM-RegisteredInitiated state 103 if it requests for an attachment to the core network 17. If the attachment request is accepted and the default bearer is activated, the user equipment 11 enters the EMM-Registered state 104. For some occasions, the user equipment 11 will initiate a service request to recall the bearer. One example of the occasions is when the user equipment 11 tries to wake up from the sleep mode. During the establishment of the bearer, the user equipment 11 is in the EMM-ServiceRequestInitiated state 105. After the bearer has been established, the user equipment 11 returns to the EMM-Registered state 104 again. Afterwards, the user equipment 11 enters the EMM-Deregistered state 102 again if it is detached from the core network 17.

In order to make the relay station 13 act like a base station to the user equipment 11, the relay station 13 has to create a backhaul connection (i.e. the S1 interface) to communicate with the core network 17 so that it can translate the backhaul control messages received from the user equipment 11 and relay the translated backhaul control message to the core network 17. Additionally, the relay station 13 has to create a radio connection between itself and the core network 17.

No solution currently exists for a node in a wireless communication system to establish both a backhaul connection and a radio connection. Specifically, current technologies only support a base station to create a backhaul connection and support a user equipment to create a radio connection. According to the aforementioned descriptions, a mechanism and method for a node to create both a backhaul connection and a radio connection is needed.

SUMMARY

An objective of certain embodiments of the present invention is to provide a backhaul connection method for use in a relay station. The relay station adopts a Non-Access Stratum (NAS) mechanism. The wireless communication system comprises a user equipment, the relay station, a base station, and a core network. The backhaul connection method comprises the steps of (a) enabling the relay station to enter a first state of the NAS mechanism after the relay station creates a radio connection with the core network, (b) enabling the relay station to transmit a backhaul connection request to the core network after the step (a), (c) enabling the relay station to enter a second state of the NAS mechanism after the step (b), (d) enabling the relay station to receive a backhaul connection response from the core network after the step (c) and (e) enabling the relay station to enter the first state after the step (d).

Another objective of certain embodiments of the present invention is to provide a relay station for use in a wireless communication system. The relay station adopts an NAS mechanism. The wireless communication system comprises a user equipment, the relay station, a base station, and a core network. The relay station comprises a processing unit and a transceiver. The processing unit is configured to enter a first state of the NAS mechanism after the relay station creates a radio connection with the core network. The transceiver is configured to transmit a backhaul connection request to the core network, and the relay station enters the first state. The processing unit is further configured to enter a second state of the NAS mechanism after the transmission of the backhaul connection request. The transceiver is further configured to receive a backhaul connection response from the core network after the transmission of the backhaul connection request. The processing unit is further configured to enter the first state after the receipt of the backhaul connection response.

The NAS mechanism adopted in certain embodiments of the present invention is configured so that the relay station and the backhaul connection method thereof of certain embodiments of the present invention can follow the state transition when creating both a radio connection with a core network and a backhaul connection with a core network.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1A:
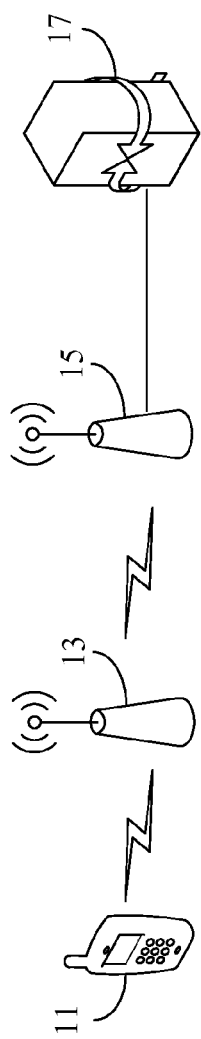
FIG. 1A illustrates the schematic view of a conventional wireless communication system.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to various example embodiments; nevertheless, these embodiments are not intended to limit the present invention to any specific example, environment, applications, or particular implementations described in these example embodiments. Therefore, descriptions of these example embodiments are only provided for purpose of illustration rather than to limit the present invention. It should be appreciated that elements unrelated directly to the present invention are omitted from the embodiments and the attached drawings.

Figure 2A:
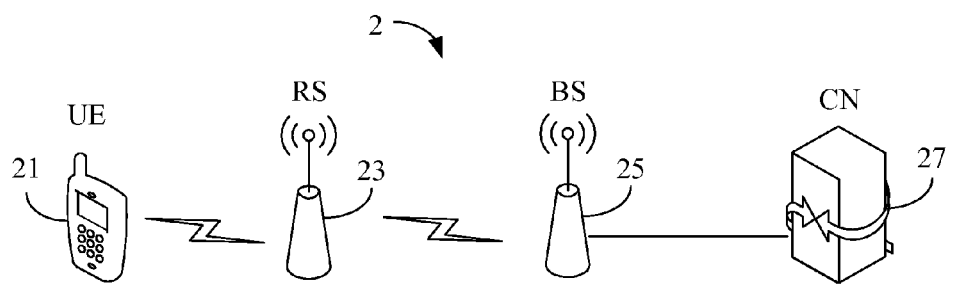
FIG. 2A illustrates a wireless communication system of a first example embodiment of the present invention.
Figure 2B:
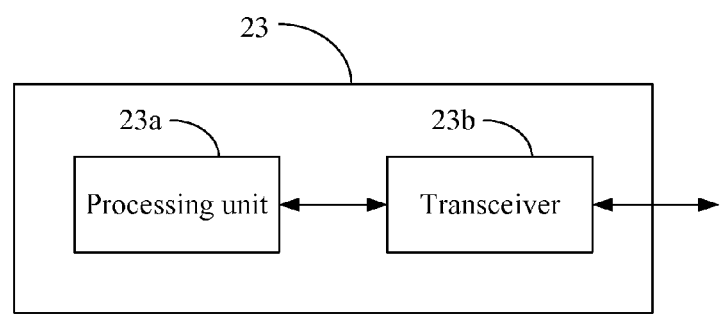
FIG. 2B illustrates a schematic view of the relay station of the first example embodiment.

FIG. 2A illustrates a first example embodiment of the present invention, which is a wireless communication system 2. The wireless communication system 2 comprises a user equipment 21, a relay station 23, a base station 25, and a core network 27. The relay station 23 is wirelessly connected to the base station 25, while the base station 25 is wiredly connected to the core network 27. The relay station 23 comprises a processing unit 23a and a transceiver 23b as drawn in FIG. 2B. The processing unit 23a may be any of various processors, central processing units (CPUs), microprocessors, or other computing devices known to people skilled in the art. In addition, the transceiver 23b may be any of various transceivers that known to people skilled in the art.

In order to serve the user equipment 21 like a base station (such as the base station 25) does, the relay station 23 has to build a backhaul connection between the relay station 23 and the base station 25. In this example embodiment, the relay station 23 adopts a Non-Access Stratum (NAS) mechanism, which is a revision of the conventional NAS mechanism. The NAS mechanism of the present invention provides state transitions so that the relay station 23 can be triggered to create the backhaul connection with the base station 25 after the creation of the radio connection.

The transceiver 23b of the relay station 23 may create a radio link with the base station 25 during a relay attach procedure, a generic radio bearer establishment procedure, etc. After the relay station 23 creates the radio connection with the core network 27, the processing unit 23a enters a first state of the NAS mechanism. After the relay station 23 enters the first state of the NAS mechanism, the transceiver 23b transmits a backhaul connection request to the core network 25. Following that, the processing unit 23a enters a second state of the NAS mechanism, which means that the relay station 23 is triggered to create the backhaul connection with the base station 25. After receiving the backhaul connection request, the base station 25 transmits a backhaul connection response to the relay station 23. After the transceiver 23b of the relay station 23 receives the backhaul connection response from the base station 25, the processing unit 23a enters the first state again.

According to the above descriptions, since the NAS mechanism adopted by the relay station 23 has more states than conventional NAS mechanism, the relay station 23 can create both the radio connection as well as the backhaul connection.

A second example embodiment of the present invention is also the wireless communication system 2. Particularly, the wireless communication system 2 conforms to the long term evolution (LTE) standard. In this embodiment, the relay station 23 may be a relay node, a Relay E-UTRAN NodeB (ReNB), or a Relay eNB, the base station 25 may be a Doner E-UTRAN NodeB (DeNB), the core network 27 is an Evolved Packet Core (EPC), which may be a Mobility Management Entity (MME), a PDN Gateway (P-GW), a Serving Gateway (S-GW), other eNB, or other DeNB. It is noted that different organizations and/or companies name the relay station, base station, and core network of the LTE standard in different ways, so the above specific names of the relay station 23, base station 25, and core network 27 are not used to limit the scope of the present invention. Since the wireless communication system 2 is specialized for the LTE standard, the aforementioned first state, second state, and state transitions are specialized for the LTE standard as well.

Figure 1B:
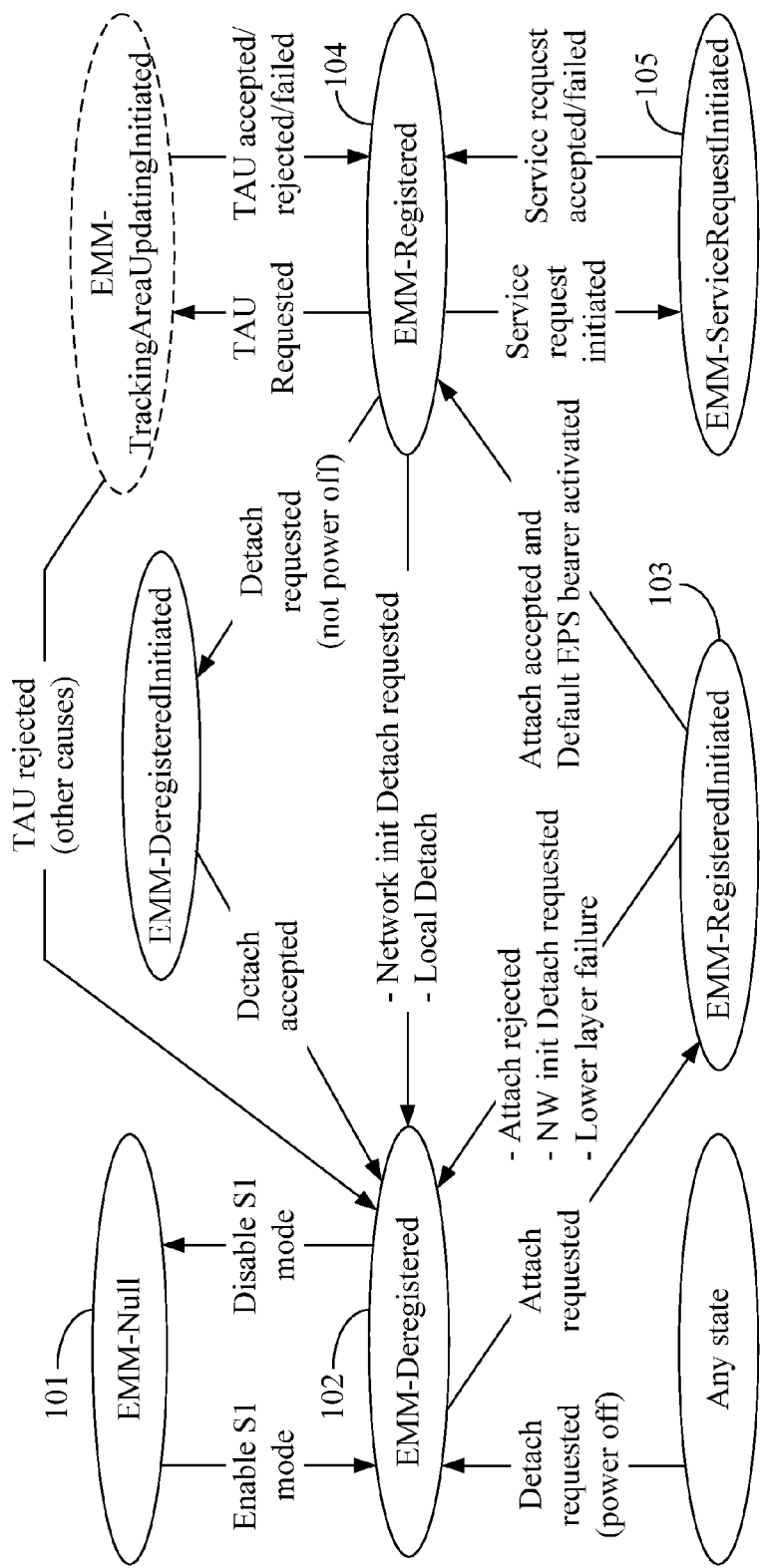
FIG. 1B illustrates the states and the state transitions of a conventional NAS mechanism.

In the second example embodiment, the relay station 23 is always powered on, which means that the relay station 23 will never be in the sleep mode and provides no Discontinuous Reception (DRX). Since the relay station 23 will never be in the sleep mode (i.e. provides no DRX), the relay station 23 does not require the EMM-ServiceRequestInitiated state 105 in the conventional NAS mechanism as shown in FIG. 1B. Thus, the present invention deletes the EMM-ServiceRequestInitiated state 105 and adds the EMM-S1X2SetupRequestInitiated state 305.

Figure 3A:
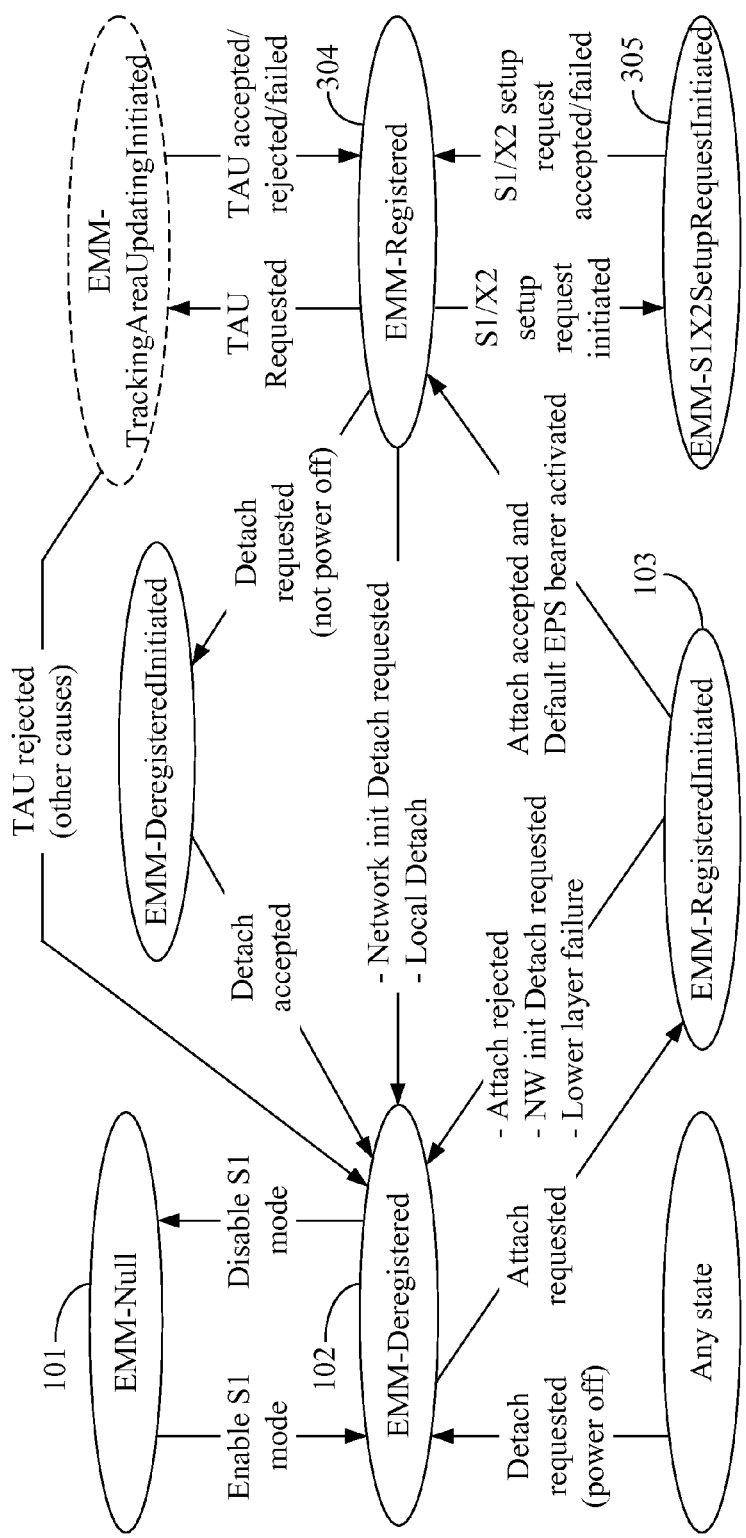
FIG. 3A illustrates an NAS mechanism used in a second example embodiment.

FIG. 3A illustrates the states and the state transitions of an NAS mechanism that is used in the second example embodiment. Comparing to the conventional NAS mechanism, the NAS mechanism of the second example embodiment removes the EMM-ServiceRequestedInitiated state 105 and has another state that requests for backhaul connection. For convenience, another state is named as EMM-S1X2SetupRequestInitiated state 305 in this embodiment. According to the NAS mechanism, the relay station 23 will enters the EMM-S1X2SetupRequestInitiated state 305 when the relay station 23 transmits an S1 interface setup request and/or an X2 interface setup request. The relay station 23 will leave the EMM-S1X2SetupRequestInitiated state 305 for the EMM-registered state 304 when the relay station 23 receives an S1 interface setup response and/or an X2 interface setup response.

Figure 3B:
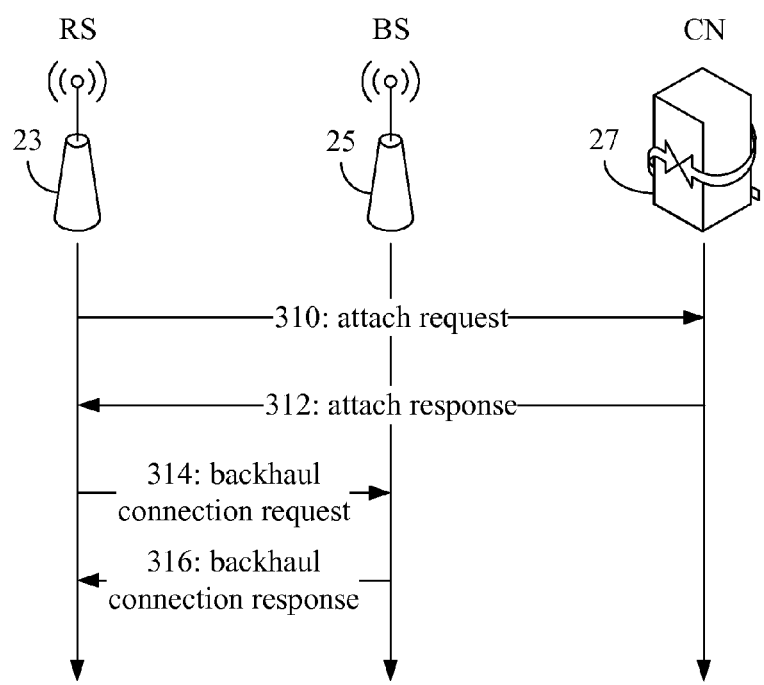
FIG. 3B illustrates the signal flows of an example in the second example embodiment.

An example regarding to the relay attach procedure is given below, whose signal flows are illustrated in FIG. 3B. The relay station 23 starts at an EMM-Null state 101. After the relay station 23 enables the S1 mode, it enters the EMM-Deregistered state 102. Next, the relay station 23 performs a relay attachment procedure to create a radio link. Specifically, the relay station 23 transmits an attach request 310 to the core network 27 and then enters the EMM-RegisteredInitiated state 103. Then, the core network 27 transmits an attach response 312 to the relay station 23. The relay station 23 receives the attach response 312 and enters the EMM-Registered state 304 (i.e. the first state). The radio connection of the relay station 23 is now created.

Next, the relay station 23 transmits a backhaul connection request 314 (e.g. an S1 interface setup request or an X2 interface setup request) to the base station 25 and enters the EMM-S1X2SetupRequestInitiated state 305 (i.e. the second state). It is noted that the second state is a state that requests for backhaul connection. Afterwards, the base station 25 transmits a backhaul connection response 316 to the relay station 23 to respond to the backhaul connection request 314. When the backhaul connection request 314 is an S1 interface setup request, the backhaul connection response 316 is an S1 interface setup response. Likewise, when the backhaul connection request 314 is an X2 interface setup request, the backhaul connection response 316 is an X2 interface setup response. After the relay station 23 receives the backhaul connection response 316, the relay station 23 enters the EMM-Registered state 304 (i.e. the first state) again.

In this example embodiment, the base station 25 transmits the backhaul connection response 316 to the relay station 23 right after receiving the backhaul connection request 314. However, in some other example embodiments, the base station 25 may have to wait a response from the core network 27 after receiving the backhaul connection request 314. For those embodiments, the base station 25 transmits the backhaul connection response 316 to the relay station 23 after receiving both the backhaul connection request 314 from the relay station 23 and a response from the core network 27.

Figure 3C:
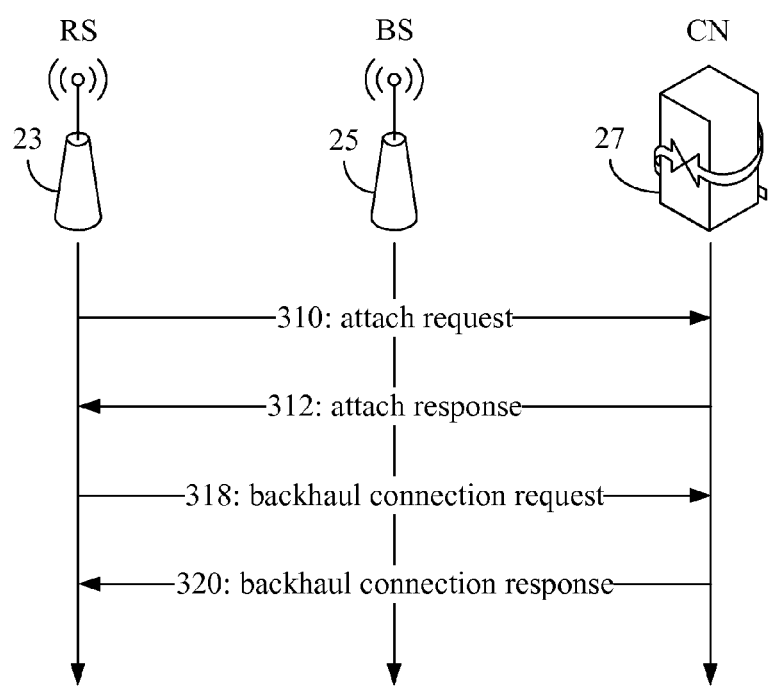
FIG. 3C illustrates the signal flows of another example in the second example embodiment.

Another example regarding to the relay attach procedure is given below, whose signal flows are illustrated in FIG. 3C. Similarly, the relay station 23 starts at an EMM-Null state 101. After the relay station 23 enables the S1 mode, it enters the EMM-Deregistered state 102. Next, the relay station 23 performs a relay attachment procedure to create a radio link. Specifically, the relay station 23 transmits an attach request 310 to the core network 27 and then enters the EMM-RegisteredInitiated state 103. Then, the core network 27 transmits an attach response 312 to the relay station 23. The relay station 23 receives the attach response 312 and enters the EMM-Registered state 304 (i.e. the first state). The radio connection of the relay station 23 is now created.

Next, the relay station 23 transmits a backhaul connection request 318 (e.g. an S1 interface setup request or an X2 interface setup request) to the base station 25 and the base station 25 relays the backhaul connection request 318 to the core network 27. It means that the base station 25 does not interpret the content of the backhaul connection request 318. After the relay station 23 transmits the backhaul connection request 318, it enters the EMM-S1X2SetupRequestInitiated state 305 (i.e. the second state). It is noted that the second state is a state that requests for backhaul connection. Afterwards, the core network 27 transmits a backhaul connection response 320 to the base station 25 and the base station 25 relays the backhaul connection response 320 to the relay station 23. When the backhaul connection request 318 is an S1 interface setup request, the backhaul connection response 320 is an S1 interface setup response. Likewise, when the backhaul connection request 318 is an X2 interface setup request, the backhaul connection response 320 is an X2 interface setup response. After the relay station 23 receives the backhaul connection response 320, the relay station 23 enters the EMM-Registered state 304 (i.e. the first state) again.

According to the above descriptions, since the NAS mechanism adopted by the relay station 23 revise the conventional NAS mechanism by adding a state for triggering the relay station to create backhaul connection, the relay station 23 can create both the radio connection as well as the backhaul connection.

A third example embodiment of the present invention is also the wireless communication system 2 conforming to the LTE standard. Likewise, the relay station 23 may be a relay node or a ReNB, the base station 25 may be a DeNB, the core network 27 may be an MME, a P-GW, an S-GW, or other eNB or DeNB. Since the wireless communication system 2 is specialized for the LTE standard, the aforementioned first state, second state, and state transitions are specialized for the LTE standard as well.

Figure 4A:
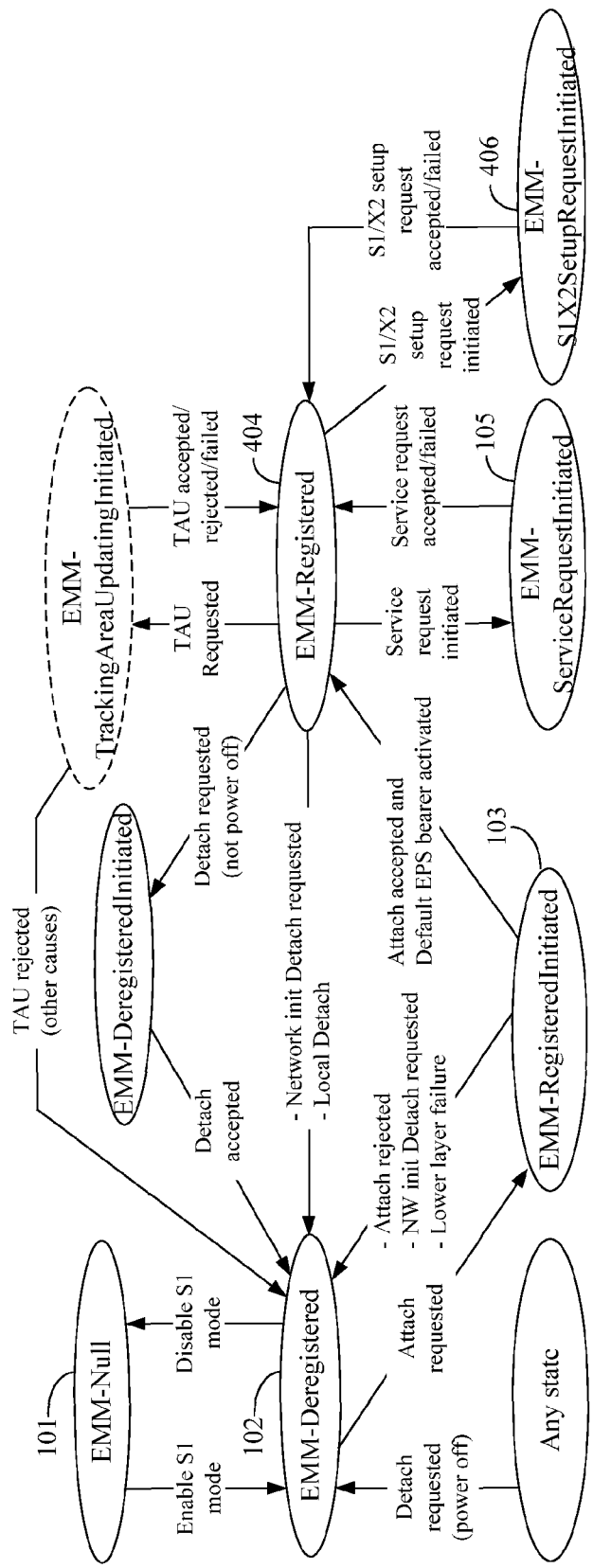
FIG. 4A illustrates an NAS mechanism used in a third example embodiment.

In the third example embodiment, the relay station 23 may initiate service request when it is in the EMM-Registered state, so the EMM-ServiceRequestInitiated state 105 in the conventional NAS mechanism as shown in FIG. 1B is still in need. Thus, this example embodiment revised the conventional NAS mechanism by adding an additional state that requests for backhaul connection. For convenience, the additional state is named as the EMM-S1X2SetupRequestInitiated state 406 as shown in FIG. 4A.

Figure 4B:
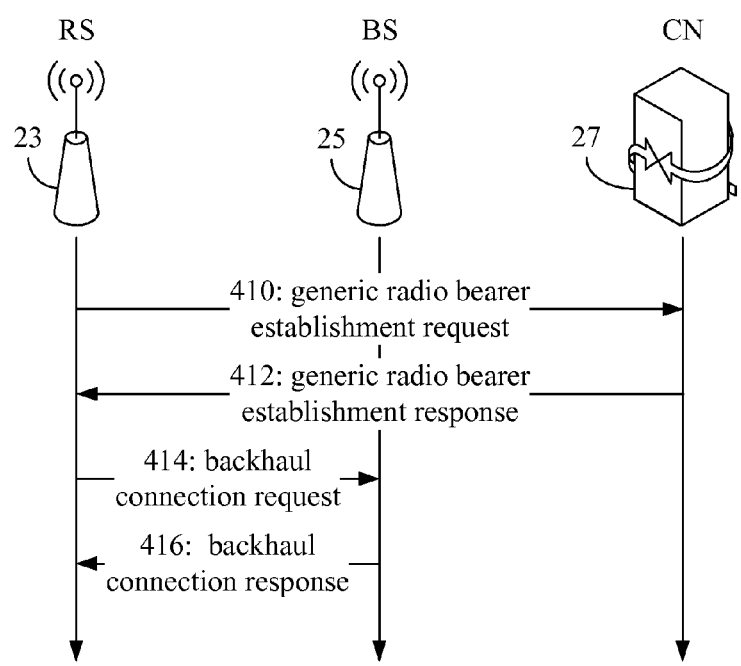
FIG. 4B illustrates the signal flows of an example in the third example embodiment.

An example regarding to a generic radio bearer establishment procedure is given below, whose signal flows are illustrated in FIG. 4B. It is assumed that the relay station 23 has created a radio connection with the core network 27 during a relay attach procedure so the relay station 23 is in the EMM-Registered state 404.

For some reasons, the relay station 23 enters into a sleep mode. Afterwards, the relay station 23 wakes up and then performs a generic radio bearer establishment procedure to create a radio link. Specifically, the relay station 23 transmits a generic radio bearer establishment request 410 to the core network 27 and then enters the EMM-ServiceInitiated state 105. Then, the core network 27 transmits a generic radio bearer establishment response 412 to the relay station 23. The relay station 23 receives the generic radio bearer establishment response 412 and enters the EMM-Registered state 404 (i.e. the first state) again. The radio connection of the relay station 23 is now created.

Next, the relay station 23 transmits a backhaul connection request 414 (e.g. an S1 interface setup request or an X2 interface setup request) to the base station 25 and enters the EMM-S1X2SetupRequestInitiated state 406 (i.e. the second state). It is noted that the second state is a state that requests for backhaul connection. Afterwards, the base station 25 transmits a backhaul connection response 416 to the relay station 23 to respond to the backhaul connection request 414. When the backhaul connection request 414 is an S1 interface setup request, the backhaul connection response 416 is an S1 interface setup response. Likewise, when the backhaul connection request 414 is an X2 interface setup request, the backhaul connection response 416 is an X2 interface setup response. After the relay station 23 receives the backhaul connection response 416, the relay station 23 enters the EMM-Registered state 404 (i.e. the first state) again.

In this example embodiment, the base station 25 transmits the backhaul connection response 416 to the relay station 23 right after receiving the backhaul connection request 414.

However, in some other example embodiments, the base station 25 may have to wait a response from the core network 27 after receiving the backhaul connection request 414. For those embodiments, the base station 25 transmits the backhaul connection response 416 to the relay station 23 after receiving both the backhaul connection request 414 from the relay station 23 and a response from the core network 27.

Figure 4C:
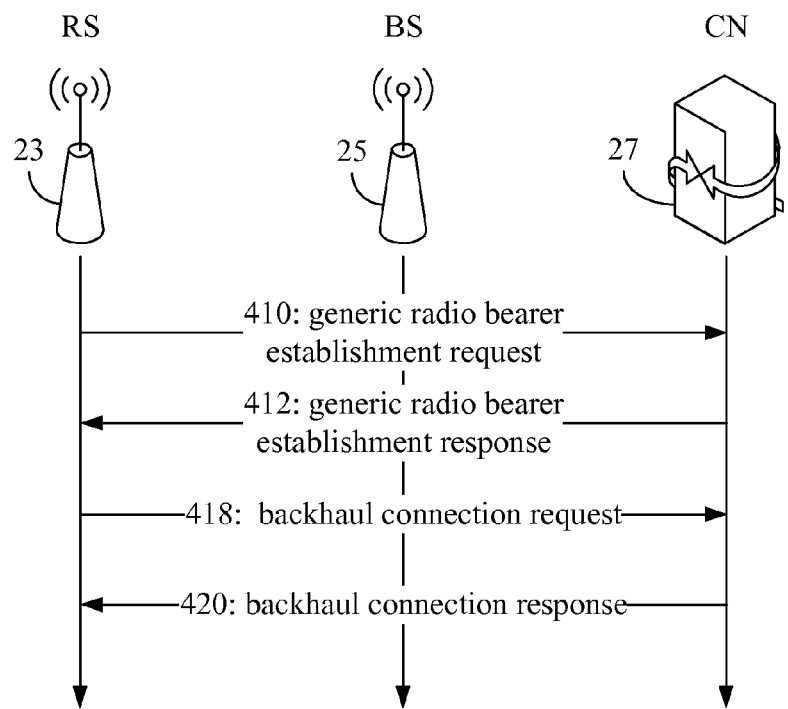
FIG. 4C illustrates the signal flows of another example in the third example embodiment.

Another example regarding to a generic radio bearer establishment procedure is given below, whose signal flows are illustrated in FIG. 4C. It is assumed that the relay station 23 has created a radio connection with the core network 27 during a relay attach procedure so the relay station 23 is in the EMM-Registered state 404.

Similarly, the relay station 23 enters into a sleep mode for some reason. Afterwards, the relay station 23 wakes up and then performs a generic radio bearer establishment procedure to create a radio link. Specifically, the relay station 23 transmits a generic radio bearer establishment request 410 to the core network 27 and then enters the EMM-ServiceInitiated state 105. Then, the core network 27 transmits a generic radio bearer establishment response 412 to the relay station 23. The relay station 23 receives the generic radio bearer establishment response 412 and enters the EMM-Registered state 404 (i.e. the first state) again. The radio connection of the relay station 23 is now created.

Next, the relay station 23 transmits a backhaul connection request 418 (e.g. an S1 interface setup request or an X2 interface setup request) to the base station 25 and the base station 25 relays the backhaul connection request 418 to the core network 27. After the relay station 23 transmits the backhaul connection request 418, it enters the EMM-S1X2SetupRequestInitiated state 406 (i.e. the second state). It is noted that the second state is a state that requests for backhaul connection. Afterwards, the core network 27 transmits a backhaul connection response 420 to the base station 25 and the base station 25 relays the backhaul connection response 420 to the relay station 23. When the backhaul connection request 418 is an S1 interface setup request, the backhaul connection response 420 is an S1 interface setup response. Likewise, when the backhaul connection request 418 is an X2 interface setup request, the backhaul connection response 420 is an X2 interface setup response. After the relay station 23 receives the backhaul connection response 420, the relay station 23 enters the EMM-Registered state 404 (i.e. the first state) again.

According to the above descriptions, since the NAS mechanism adopted by the relay station 23 has more states than conventional NAS mechanism, the relay station 23 can create both the radio connection as well as the backhaul connection by the NAS mechanism.

Figure 5:
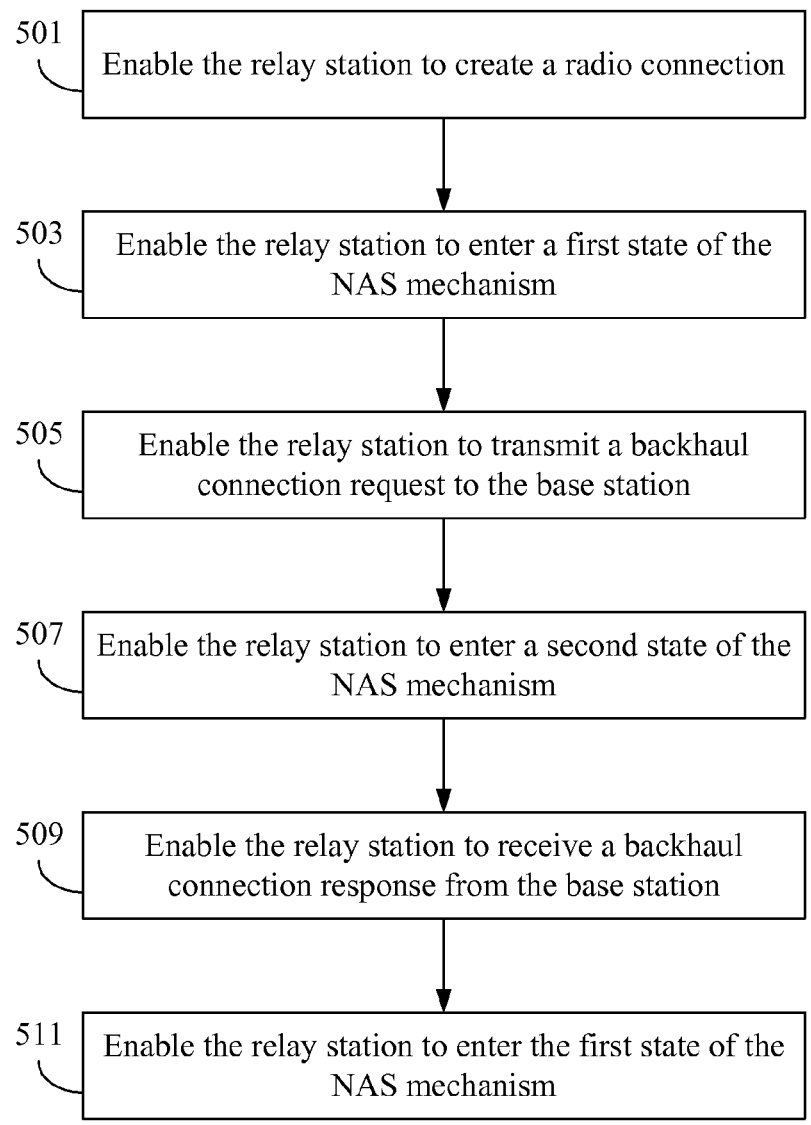
FIG. 5 illustrates the flowchart of a fourth example embodiment of the present invention.

A fourth example embodiment of the present invention is a backhaul connection method for use in a relay station, such as the relay station 23, in a wireless communication system. The wireless communication system comprises the relay station, a base station, and a core network. The relay station adopts an NAS mechanism. Particularly, the NAS mechanism used by the relay station is like the one illustrated in FIG. 3A when the relay station does not provide DRX. If the relay station provides DRX, the NAS mechanism used by the relay station is like the one drawn in FIG. 4A. FIG. 5 illustrates the flowchart of the fourth example embodiment of the present invention.

First, the backhaul connection method executes step 501 to enable the relay station to create a radio connection. It is noted that step 501 may be executed in a relay attach procedure or a generic radio bearer establishment procedure. Next, step 503 is executed to enable the relay station to enter a first state of the NAS mechanism. If the wireless communication system conforms to the LIE standard, the first state is an EMM-registered state of the LIE standard.

Afterwards, the backhaul connection method executes step 505 to enable the relay station to transmit a backhaul connection request to the base station. When the wireless communication system conforms to the LIE standard, the backhaul connection request is an S1 interface setup request or an X2 interface setup request. Next, step 507 is executed to enable the relay station to enter a second state of the NAS mechanism. When the backhaul connection request is an S1 interface setup request, the backhaul connection response is an S1 interface setup response. When the backhaul connection request is an X2 interface setup request, the backhaul connection response is an X2 interface setup response. It is noted that the second state is a state that requests for backhaul connection, such as the aforementioned EMM-S1X2SetupRequestInitiated state. Following that, step 509 is executed to enable the relay station to receive a backhaul connection response from the base station. Afterwards, step 511 is executed to enable the relay station to enter the first state again.

In addition to the aforesaid steps, the fourth example embodiment can also execute all the operations and functions set forth in the first, second, and third example embodiments. How the fourth example embodiment executes these operations and functions will be readily appreciated by those of ordinary skill in the art based on the explanation of the first, second, and third example embodiments, and thus will not be further described herein.

According to the above descriptions, the present invention provides an NAS mechanism having a state that can triggers the relay station to create backhaul connection after the creation of the radio connection. Thus, the relay station and the backhaul connection method thereof of the present invention can adopt the NAS mechanism to create both radio connection and backhaul connection. By doing so, the relay station can act like a user equipment to the core network and act like a base station to a user equipment.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A backhaul connection method for use in a relay station, the relay station adopting a Non-Access Stratum (NAS) mechanism, a wireless communication system comprising the relay station, a base station, and a core network, the backhaul connection method comprising the steps of:
    (a) enabling the relay station to enter a first state of the NAS mechanism after the relay station creates a radio connection with the core network;
    (b) enabling the relay station to transmit a backhaul connection request to the base station after the step (a);
    (c) enabling the relay station to enter a second state of the NAS mechanism after the step (b);
    (d) enabling the relay station to receive a backhaul connection response from the base station after the step (c); and
    (e) enabling the relay station to enter the first state after the step (d).

2. The backhaul connection method of claim 1, wherein the wireless communication system conforms to the Long Term Evolution (LTE) standard, the relay station is one of a relay node, a Relay E-UTRAN NodeB (ReNB), and a relay eNB, the base station is a Doner E-UTRAN NodeB (DeNB), the core network is an Evolved Packet Core (EPC).

3. The backhaul connection method of claim 1, wherein the wireless communication system conforms to the LTE standard, the backhaul connection request is an S1 interface setup request, and the backhaul connection response is an S1 interface setup response.

4. The backhaul connection method of claim 1, wherein the wireless communication system conforms to the LTE standard, the backhaul connection request is an X2 interface setup request, and the backhaul connection response is an X2 interface setup response.

5. The backhaul connection method of claim 1, wherein the wireless communication system conforms to the LTE standard, the first state is an EPS Mobility Management (EMM)-registered state of the LTE standard, and the second state is a state that requests for backhaul connection.

6. The backhaul connection method of claim 1, further comprising the step before the step (a) of:
(f) enabling the relay station to create the radio connection with the core network during a relay attach procedure.

7. The backhaul connection method of claim 1, further comprising the step before the step (a) of:
(f) enabling the relay station to create the radio connection with the core network during a generic radio bearer establishment procedure.

8. A relay station for use in a wireless communication system, the relay station adopting an NAS mechanism, the wireless communication system comprising the relay station, a base station, and a core network, the relay station comprising:
a processing unit being configured to enter a first state of the NAS mechanism after the relay station creates a radio connection with the core network; and
a transceiver being configured to transmit a backhaul connection request to the base station after the relay station enters the first state,
wherein the processing unit is further configured to enter a second state of the NAS mechanism after the transmission of the backhaul connection request, the transceiver is further configured to receive a backhaul connection response from the base station after the transmission of the backhaul connection request, and the processing unit is further configured to enter the first state after the receipt of the backhaul connection response.

9. The relay station of claim 8, wherein the wireless communication system conforms to the LTE standard, the relay station is one of a relay node, a ReNB, and a relay eNB, the base station is a DeNB, the core network is an EPC.

10. The relay station of claim 8, wherein the wireless communication system conforms to the LTE standard, the backhaul connection request is an S1 interface setup request, and the backhaul connection response is an S1 interface setup response.

11. The relay station of claim 8, wherein the wireless communication system conforms to the LTE standard, the backhaul connection request is an X2 interface setup request, and the backhaul connection response is an X2 interface setup response.

12. The relay station of claim 8, wherein the wireless communication system conforms to the LTE standard, the first state is an EMM-registered state of the LTE standard, and the second state is a state that requests for backhaul connection.

13. The relay station of claim 8, wherein the transceiver is further configured to create the radio connection with the core network during a relay attach procedure before entering the first state.

14. The relay station of claim 8, wherein the transceiver is further configured to create the radio connection with the core network during a generic radio bearer establishment procedure before entering the first state.

* * * * *